United States Patent [19]
Malik et al.

[11] Patent Number: 5,822,620
[45] Date of Patent: Oct. 13, 1998

[54] SYSTEM FOR DATA ALIGNMENT BY USING MASK AND ALIGNMENT DATA JUST BEFORE USE OF REQUEST BYTE BY FUNCTIONAL UNIT

[75] Inventors: Nadeem Malik; Alan Vicha Pita; Avijit Saha, all of Austin; Subhash Rasiklal Vohra, Round Rock, all of Tex.

[73] Assignee: International Business Machines Corporation, Armonk, N.Y.

[21] Appl. No.: 907,995

[22] Filed: Aug. 11, 1997

[51] Int. Cl.[6] ........................................ G06F 7/00
[52] U.S. Cl. ............................. 395/898; 395/565
[58] Field of Search ...................... 395/898, 565

[56] References Cited

U.S. PATENT DOCUMENTS

| | | | |
|---|---|---|---|
| 5,276,891 | 1/1994 | Patel | 395/898 |
| 5,392,406 | 2/1995 | Petersen | 395/311 |
| 5,517,627 | 5/1996 | Petersen | 395/311 |
| 5,526,296 | 6/1996 | Nakahara et al. | 364/715.08 |
| 5,619,715 | 4/1997 | Dinkjian et al. | 395/898 |
| 5,701,517 | 12/1997 | Carpenter | 395/886 |

*Primary Examiner*—Krisna Lim
*Attorney, Agent, or Firm*—Robert V. Wilder

[57] ABSTRACT

A method and implementing system are provided in which specific byte requests made by a functional unit within a computer system effect the return of a word containing the requested byte to a register device within a CPU. The returned word is stored "as is" and without alignment, together with mask and alignment data indicative of the location of the requested byte within the stored word. Alignment relative to the requested byte is thereafter accomplished using the mask and alignment data just before use of the requested byte by the functional unit. The alignment function is thereby accomplished outside of the processor critical path which obviates the typical memory-processor mismatch delay inherent in prior art data alignment networks and substantially shortens the critical path in the memory access stage of the processor's pipeline.

16 Claims, 4 Drawing Sheets

SYSTEM FOR DATA ALIGNMENT BY USING MASK AND ALIGNMENT DATA JUST BEFORE USE OF REQUEST BYTE BY FUNCTIONAL UNIT

FIELD OF THE INVENTION

The present invention relates generally to information processing systems and more particularly to an improved system and methodology for the alignment of data for processing.

BACKGROUND OF THE INVENTION

In computer systems and networks, the performance of the computer processors is of paramount importance. Most modern microprocessors are performance-limited due to the handling of data alignment in the load/store unit. All computer Instruction Set Architectures (ISAs), define instructions that have the effect of loading some value from outside of the computer processor (i.e. memory or I/O) into a register in the microprocessor. Such values are usually loaded into the processor via a wide datapath which connects the processor with the remainder of the computer system. The datapath is commonly 32, 64, 128 or more bits wide in modern systems. Many ISAs define load instructions that only make use of a small, contiguous subset of these bits, i.e. a load-byte instruction to load only one byte of a multi-byte data segment.

The data which arrives at the processor's data bus is aligned within the width of the datapath with respect to its position in memory from which it was fetched. Unless the memory access happens to be at an aligned address at which the fetched data byte resides, the requested data may not be aligned in such a way that the data can be used without any alignment by the processor. In all cases the unused bits must be masked away.

In most modern computer processors, the problem is solved in the load/store unit of the processor, which, when receiving fetched data from off of the processor chip, will first mask and align the incoming data, then store it in a register. The circuit which performs this masking and alignment is called the data alignment network. The data alignment network is in the "memory access path", which is a portion of the processor circuit that, due to memory-processor speed mismatches, is commonly the slowest circuit in the processor (called "the critical path") and as a result defines the processor cycle time or cycle speed.

Accordingly, there is a need for an enhanced method and processing apparatus which is effective to accomplish the data alignment function without unduly slowing the critical path.

SUMMARY OF THE INVENTION

A method and apparatus is provided in which a request for a specific data component made by a functional unit within a computer system is fulfilled by the return of a data segment containing the requested data component. The data component is in a non-aligned format relative to a predetermined alignment reference. The returned data segment is stored "as is" and without alignment, together with mask and alignment data indicative of the location of the requested data component within the stored data segment. Alignment relative to the requested data component is accomplished after processing using the mask and alignment data, and before use of the processed information by the functional unit.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
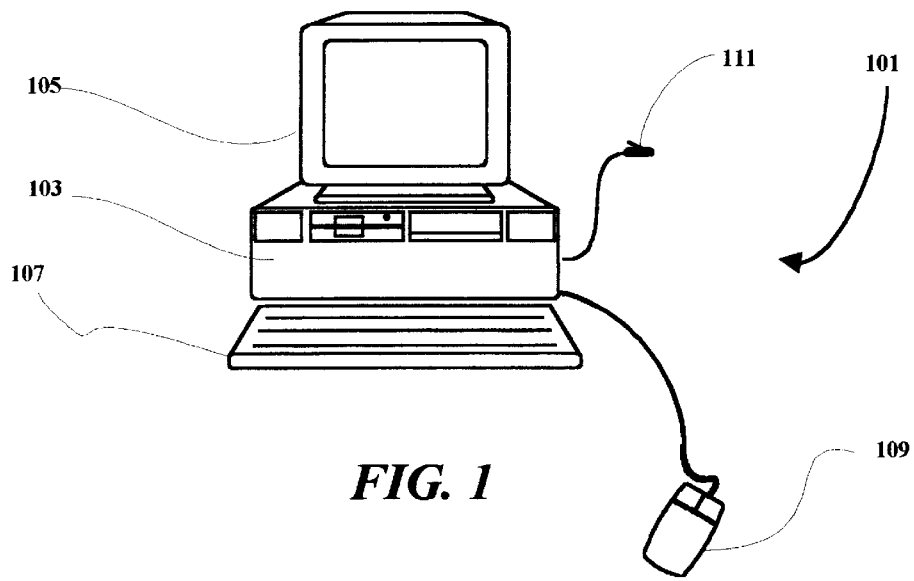
FIG. 1 is a diagram of a computer system in which the present invention may be implemented.

With reference to FIG. 1, the various methods discussed herein may be implemented within a microcontroller or embedded controller, or within a typical computer system 101 which may include a workstation or personal computer. In general, an implementing computer system may include a plurality of processors in a multi-bus system in a network of similar systems. However, since the workstation or computer system 101 within which the present invention is implemented in the present example is, for the most part, generally known in the art and composed of electronic components and circuits which are also generally known to those skilled in the art, circuit details beyond those shown in FIG. 1, will not be explained to any greater extent than that considered necessary as illustrated, for the understanding and appreciation of the underlying concepts of the present invention and in order not to obfuscate or distract from the teachings of the present invention.

In FIG. 1, the computer system includes a processor enclosure 103 which is typically arranged for housing a processor circuit along with other component devices and subsystems of the computer system 101. The computer system 101 also includes a monitor unit 105, a keyboard 107 and a mouse or pointing device 109, which are all interconnected with the computer system illustrated. Also shown is a connector 111 which is arranged for connecting a modem within the computer system to a communication line such as a telephone line in the present example. The present invention may also be implemented in a hard-wired site or local network, or a cellular system in which case the connector 111 may not be required.

Figure 2:
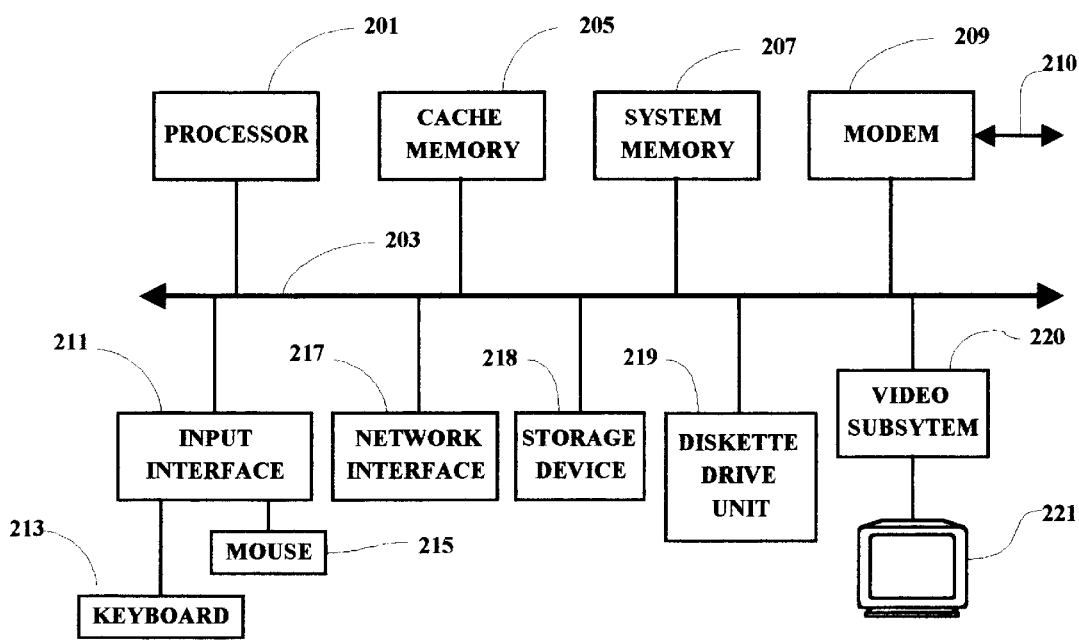
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a network interface subsystem 217 which may include connections to a local or remote site network. A diskette drive unit 219 is also connected to the bus 203. A video subsystem 220, which may include a graphics subsystem, is connected to a display device 221. A storage device 218, which may be one or more of many available storage devices of differing storage technologies, is also coupled to the bus 203. The diskette drive unit 219 provides a means by which individual diskette programs may be loaded on to the hard drive, or accessed directly, for selective execution by the computer system 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette. Although the present example is explained in connection with magnetic media storage system and a disk drive unit, it is understood that media other than magnetic media, including but not limited to optical CDs and solid state digital devices, may also be implemented in addition to or in place of the magnetic media for storing, and making available application programs and/or application data.

In an exemplary operation, consider a system with a 32 bit (4 byte) data bus. A "load" instruction requests that a byte from address 1031 be placed into register R10. The offset 1031 modulo 4=3 indicates that when the data arrives, it will be the third byte on the four byte data bus. The first, second and fourth bytes must be masked off, and the third byte must be shifted into the least significant byte position so that when the value is used, it will accurately represent the mathematically appropriate data value.

Figure 3:
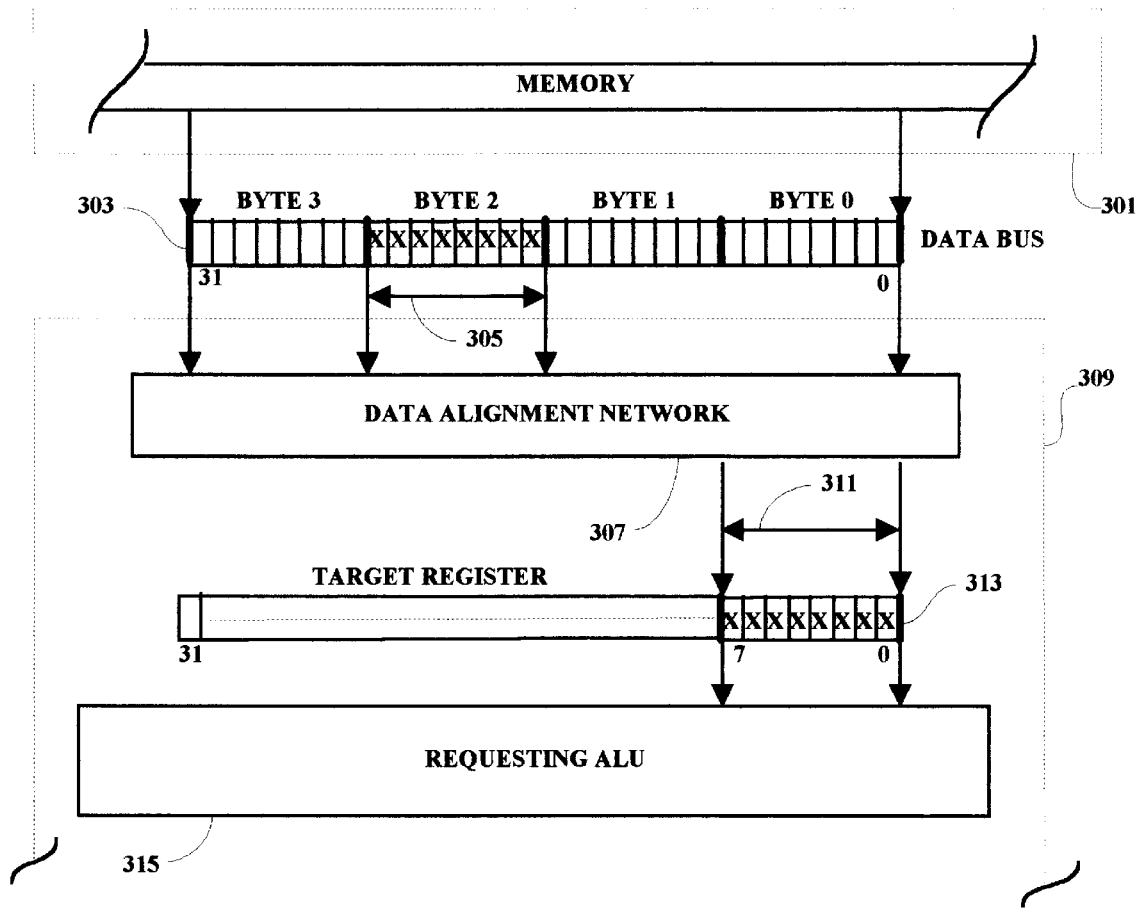
FIG. 3 is an illustration of a typical processor alignment operation.

In FIG. 3, a typical prior art data alignment process is illustrated. The FIG. 3 illustration includes a memory unit 301 connected to a data bus 303. A data alignment network 307, which is typically within a processor device or CPU 309, is arranged to receive data 305 from the data bus 303 and align the fetched data 311 relative to a starting position or least significant bit position of a register 313 within a register file section of the CPU 309. Once the fetched data is aligned, it may be processed by the ALU 315 of the CPU 309 in accordance with operating instructions being executed by the CPU 309, and output from the CPU 309 to an output register, for example, for further processing. As hereinbefore noted, the data alignment network 307, because of memory-processor speed mismatch, is commonly in the processor "critical path".

Figure 4:
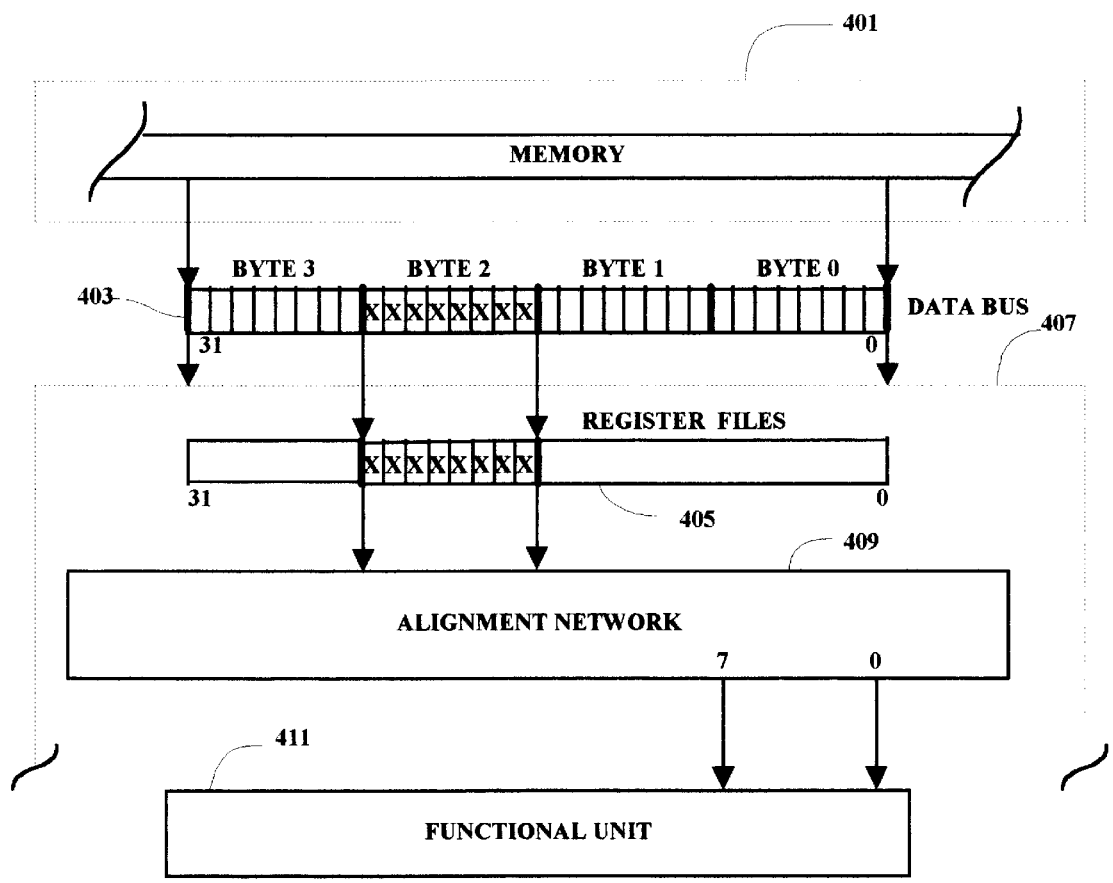
FIG. 4 is an illustration showing the alignment methodology implemented in an exemplary embodiment.

FIG. 4 illustrates an improved approach to the accomplishment of the alignment function. As illustrated, a memory unit 401 is connected to a data bus 403, which, in turn, selectively loads a fetched byte (8 bit "Byte 2" in the present example) into a register 405 of the register files of a CPU device 407. Associated alignment and mask data which identify the location of the requested byte within the fetched word are determined and stored in, for example alignment and mask registers. Thereafter, just before use by the functional unit 411 which initially requested the byte, an alignment network 409 is operable to effect a proper alignment of the requested byte and return the result to the requesting functional unit 411.

As illustrated, rather than aligning the data before it is stored into the data registers of the processor, the data is instead stored into the register "as is" in coming directly from the memory subsystem. The processor's data registers are extended with two extra fields designated as a "mask" field and an "align" field. These fields may be contained in separate corresponding registers for example. The mask field is a bit-vector identifying which of the bytes of the register is valid for a load byte command. For example, for a 32 bit/4 byte register, the mask field would contain four bits. The first bit indicates if the most significant byte contains valid data. The second bit indicates whether the second most significant byte contains valid data, and so forth. The mask field is then used by the functional unit or consumer of the data to appropriately align the data on use. The fetched byte is aligned by the user or requesting device when the fetched data segment designated by requested address is returned to the requesting device rather than being aligned in a pre-processor data alignment network located in a critical data path. The execution phase of the functional units is generally not in the critical path and therefore the moving of the alignment function to the back-end of the process helps to remove the memory access stage from the critical path. This method allows the alignment function to be accomplished outside of the processor critical path thereby obviating the typical memory-processor mismatch delay of prior art data alignment networks and substantially shortening the critical path in the memory access stage of the processor's pipeline. Since the registers are now capable of storing data which is non-aligned and which may be only partially valid, it is possible to completely eliminate the alignment network in the load/store unit of the processor.

Figure 5:
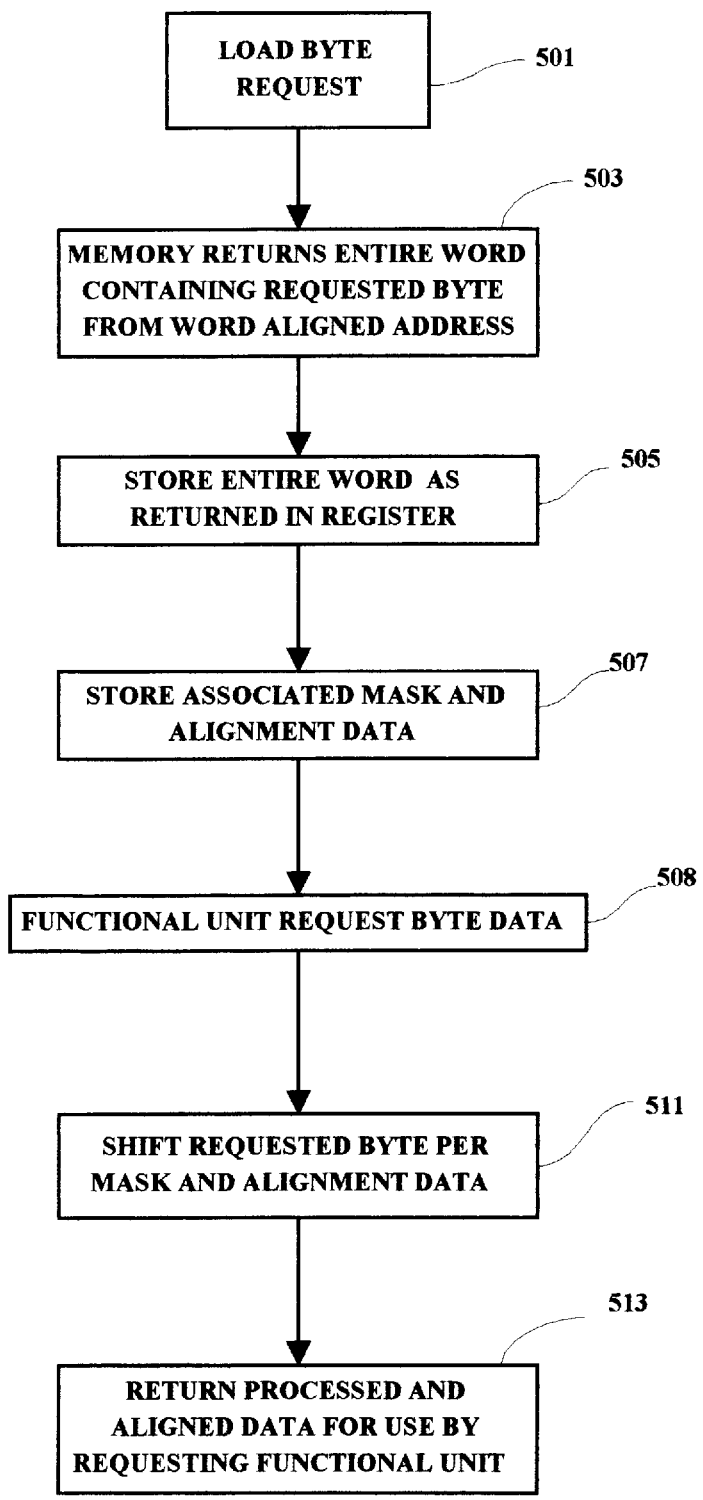
FIG. 5 is a flow chart illustrating an operational flow for the alignment methodology disclosed herein.

The disclosed methodology is illustrated in flow chart form in FIG. 5. As shown, a functional unit first initiated a "load byte" request 501. The memory fulfilling the request then returns 503 an entire word which contains the requested byte. The returned word is aligned relative to the word itself rather than relative to the requested byte. The returned word is then stored "as is" 505 and the mask and alignment data which identifies the location of the specifically requested byte within the stored word, is also stored 507 in associated mask and alignment registers. The functional unit then requests the byte data 508 and when the functional unit is ready for the processed data, the requested and processed byte is shifted 511 in accordance with the mask and alignment data, and the processed and aligned data is returned to the requesting functional unit 513.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing non-aligned data segments, said method comprising:
   receiving a first data segment in response to a request for a data component, said data component being contained as a part of said first data segment, said data component being in a non-aligned format relative to said first data segment;
   storing said first data segment;
   storing alignment data indicative of alignment parameters associated with said data component relative to said data segment; and
   aligning said processed first data segment output in accordance with said alignment data to provide an aligned data component output.

2. The method as set forth in claim 1 and further including:
returning said aligned data component output in response to said request for said data component.

3. The method as set forth in claim 1 wherein said data component is a byte of information.

4. The method as set forth in claim 3 wherein said first data segment is a data word, said data word containing said data component.

5. The method as set forth in claim 4 wherein said data component is a byte of information.

6. The method as set forth in claim 1 wherein said alignment data includes an alignment field, said alignment field being indicative of a number of bit positions said data component is out of alignment with a first data segment reference.

7. The method as set forth in claim 1 wherein said alignment data includes a mask field, said mask field being indicative of which bit positions of said first data segment comprise said data component.

8. The method as set forth in claim 6 wherein said alignment data includes a mask field, said mask field being indicative of bit positions of said first data segment which comprise said data component.

9. An information processing system comprising:
a memory device;
a data bus;
a processor unit, said memory device being connected through said data bus to said processor unit;
an alignment network arranged for receiving an output from said processor unit, said processor unit being responsive to a processing request for receiving a first data segment in response to a request for a data component, said data component being contained as a part of said first data segment, said data component being in a non-aligned format relative to said first data segment, said processor unit being further selectively operable for storing said first data segment as said first data segment is received, said processor unit being further arranged to effect storing of alignment data indicative of alignment parameters associated with said data component relative to said first data segment, said alignment network being selectively operable for aligning said first data segment output in accordance with said alignment data to provide an aligned data component output.

10. The information processing system as set forth in claim 9 wherein said processing unit includes a plurality of registers for storing said alignment data.

11. The information processing system as set forth in claim 10 wherein said data component is a byte of information.

12. The information processing system as set forth in claim 9 wherein said first data segment is a data word, said data word containing said data component.

13. The information processing system as set forth in claim 12 wherein said data component is a byte of information.

14. The information processing system as set forth in claim 9 wherein said alignment data includes an alignment field, said alignment field being indicative of a number of bit positions said data component is out of alignment with a first data segment reference.

15. The method as set forth in claim 9 wherein said alignment data includes a mask field, said mask field being indicative of which bit positions of said first data segment comprise said data component.

16. The method as set forth in claim 14 wherein said alignment data includes a mask field, said mask field being indicative of bit positions of said first data segment which comprise said data component.

* * * * *